May 9, 1944.  E. R. BOYLES ET AL  2,348,279
APPARATUS FOR FORMING AND ANNEALING COMBINATION
CURVED AND STRAIGHT GLASS
Filed Dec. 26, 1940  2 Sheets-Sheet 1
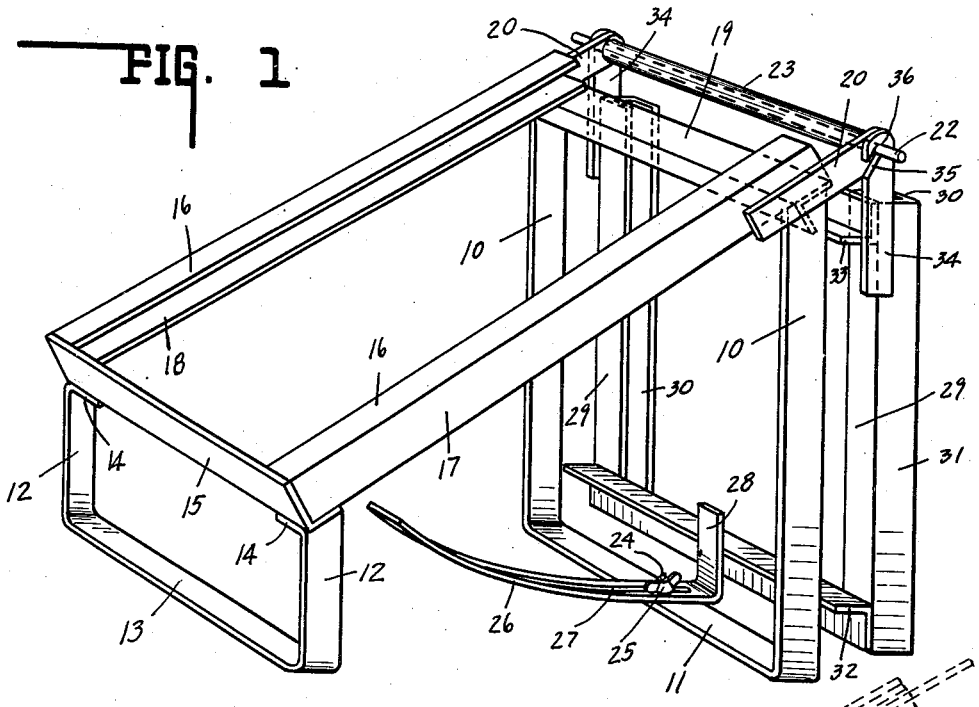
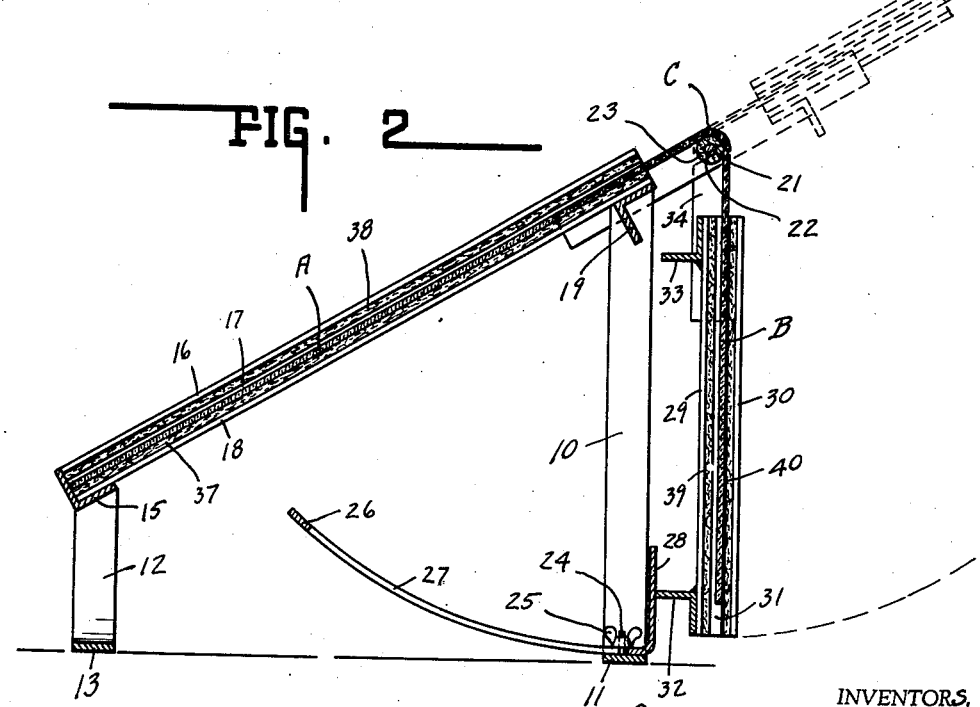
INVENTORS.
CLARENCE M. PATTISON.
EDGAR R. BOYLES,
BY Lockwood, Goldsmith & Galt.
ATTORNEYS.

May 9, 1944.  E. R. BOYLES ET AL  2,348,279
APPARATUS FOR FORMING AND ANNEALING COMBINATION
CURVED AND STRAIGHT GLASS
Filed Dec. 26, 1940   2 Sheets-Sheet 2

INVENTORS.
CLARENCE M. PATTISON.
BY   EDGAR R. BOYLES.
Lockwood, Goldsmith & Galt,
ATTORNEYS.

Patented May 9, 1944

2,348,279

UNITED STATES PATENT OFFICE 2,348,279

APPARATUS FOR FORMING AND ANNEALING COMBINATION CURVED AND STRAIGHT GLASS

Edgar R. Boyles and Clarence M. Pattison, Hartford City, Ind., assignors to The Johnston Glass Co. Inc., Hartford City, Ind., a corporation Application December 26, 1940, Serial No. 371,703

5 Claims. (Cl. 49—67)

This invention relates to apparatus for bending sheet glass for a variety of uses.

The apparatus may be utilized for the bending of single sheets of glass or the simultaneous bending of a plurality of sheets of glass when curved laminated glass structures are to be fabricated.

The present invention contemplates the formation of bent sheet glass which is capable of utilization with thin sheets of glass with the same facility as heavier sheets of glass.

The present invention also lends itself to the expeditious and continuous production of bent glass which is not burned, is absolutely true to mold contour and retains the original high polish.

The molds utilized in the present invention are of such a character that they heat up approximately at the same rate as the glass and they cool off at substantially the same rate and one suitable form of mold is a sheet metal mold.

The molds, as stated, preferably are of thin sheet metal tempered to withstand heating to a temperature sufficient to soften sheet glass. Temperatures sufficient to soften sheet glass vary from about 1,000° F. to 1,500° F., the operating range being approximately between 1,050° F. and 1,400° F. The thickness of the sheet and the kind of glass determines the softening point of that glass.

The glass and mold are gradually subjected to increasing temperatures. The rate of heating is suitably controlled so that the mold and glass are gradually brought up to a temperature known as the softening temperature of that glass. When the glass has reached this temperature, it bends by its own weight and that of a part of the mold and takes the shape of the metal mold in its final position. Immediately after assuming that final shape, the mold and bent glass continue to move into zones of progressively cooler temperatures until the time that the mold and glass are cool enough to handle without the use of tools.

The cooling period, of necessity, is of such duration that the glass in cooling will not have set up therein strains well known in the industry. In other words, the glass when it is cool has been annealed.

In order to retain the high polish in sheet glass, known as window glass, and in order to prevent burning of the surface, it is important that the temperature control be such that the glass and mold immediately start to cool after the glass has been softened and has conformed to the final mold form.

In the bending or curving of a plurality of sheets of glass, the following precautions are to be observed: The several sheets of glass are cleaned so that said sheets contain no dirt or fine particles or anything else which would mar the surface of that sheet or perhaps cause the sheets to adhere to each other. Then the two or more sheets of glass which are perfectly clean, are placed on the mold and subjected to heat and subject to the controls and cautions previously described.

The resulting product is two or more glass sheets simultaneously bent and annealed to mold conformation, each having two highly polished surfaces and each being of non-adhering character so that the glass may be removed therefrom and readily separated for the inclusion or insertion of plastic material, for the subsequent formation of safety glass, subject, however, to the fact that the safety glass will be of curved character conforming to the final mold position and with the further distinctive characteristic that the two adjacent surfaces of two simultaneously bent or curved sheets of glass are substantially complementary so that all parts of the surface of one have the same shape as the adjacent surface of the other, one being of convex character and the other being of concave character, thus producing in the finished product a safety glass which, when associated with a film of uniform thickness, is in intimate contact with the latter throughout the confronting surfaces.

The mold of the present invention is of articulated character and the flat sheet of glass, when applied to the mold, sustains a movable portion thereof until such time as the glass softens sufficient to bend, whereupon the glass sustained portion of the mold and that associated portion of the glass sheet, incident to gravity thereon, move to final position. The articulated mold may, whenever necessary or desirable, be of detachable character to permit, when required, or facilitate, when desired, bent glass removal from the mold.

From the foregoing, therefore, it will be observed that the present apparatus is one which produces ware peculiarly applicable to bent or curved glass suitable for laminated or safety glass purposes, as well as bent or curved ware of single ply character.

By way of illustration, apparatus suitable for bending glass now will be described.

Fig. 1 is a perspective view of an articulated mold of openwork character, the shield means being omitted therefrom for clearness.

Fig. 2 is a longitudinal section with a glass and shield means associated therewith and in the bent glass position, dotted lines indicating the initial mold and glass flat sheet positions.

It has been ascertained that in the bending of a sheet of flat glass or the simultaneous bending of a plurality of sheets of flat glass wherein only a portion of the glass is to be bent and the remainder is to retain its original flatness, that the flat glass portion, or portions, usually is in contact with the mold surface long enough to cause objectionable pitting or "burning." Such defects especially are objectionable in instances where the glass is intended for use in aeroplanes, lenses and the like.

Figure 3:
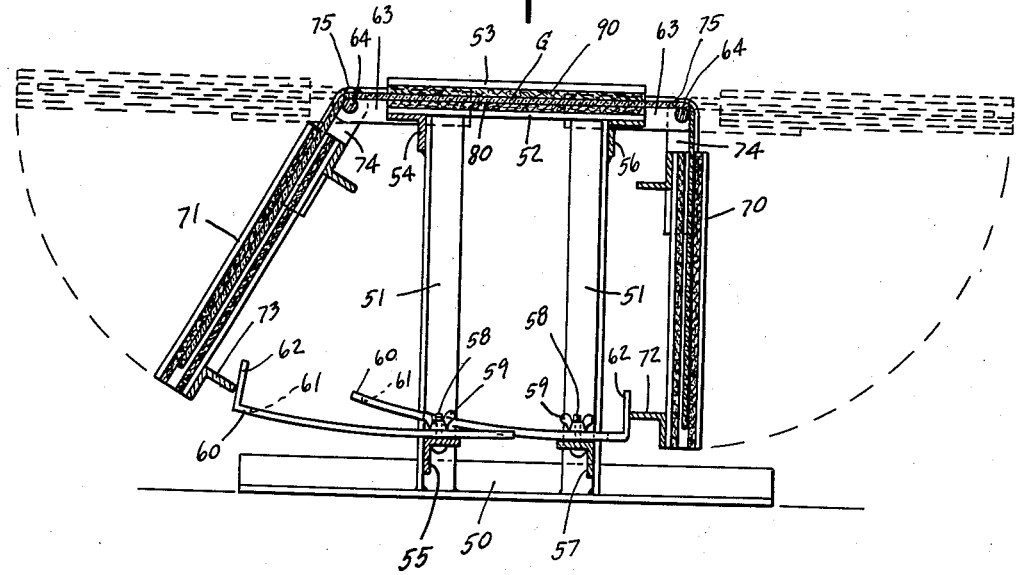
Fig. 3 is a view similar to Fig. 2 and of dual form of the invention, dotted lines indicating the initial mold and glass flat sheet positions.
Figure 4:
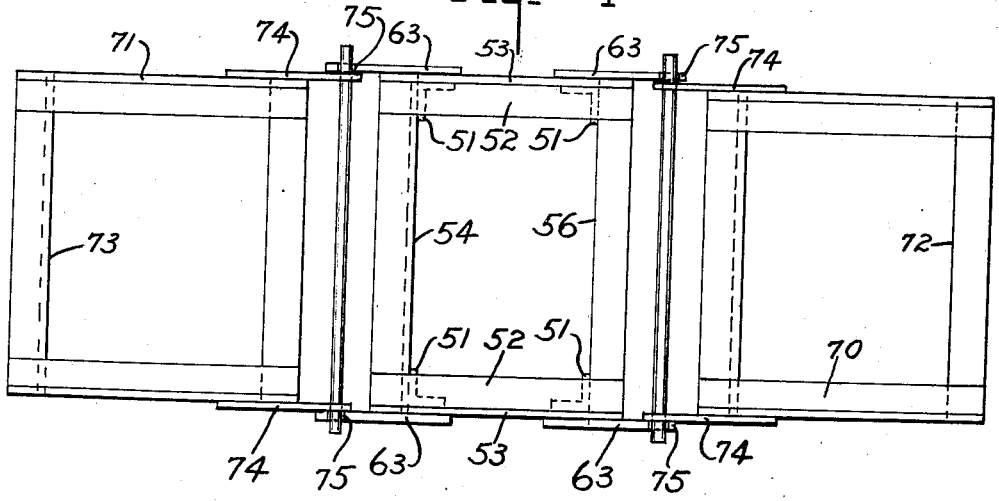
Fig. 4 is a top plan view of the invention shown in Fig. 3 with parts omitted for clearness.

The apparatus shown in Figs. 1 to 3 inclusive, represent two embodiments of the same invention which include mold structures of open-work character and wherein the glass is heat shielded.

Reference will now be had more particularly to Figs. 1 and 2 of the drawings, wherein there is illustrated an articulated, open-work mold structure, although the invention basically disclosed herein is not necessarily restricted to an open-work form of the invention.

In Figs. 1 and 2 of the drawings, 10 indicates a pair of uprights which are connected together at their lower ends by the cross member 11. Another pair of uprights 12 of lesser height and spaced approximately the same distance apart as the uprights 10, are connected together by the base portion 13. The upper ends of the uprights 12 are inwardly directed as at 14. To the same is secured an angle member 15 which has secured to it at each end, the lower ends of two confronting channels having the upper flanges 16, midportions 17 and opposite flange 18. To the upper ends of the uprights 10 is secured the angle member 19, the same being positioned oppositely with relation to the angle member 15, as shown most clearly in Fig. 2. The upper ends of the confronting channel members are suitably secured to the upper face of the angle member 19. Thus there is formed two confronting channels open at the upper end and closed at the lower end by one flange of the angle member 15.

Secured to each outside face of the midportion 17 of the channels is an extension or bar 20, the latter being apertured as at 21 to receive an elongated rod 22, the exposed ends of which are circular for forming pivots. Encircling this rod and between the members 20 is a tubular shield 23, preferably of asbestos material or the like. Extending upwardly from the midportion, for example, of the cross member or base 11 is a threaded member 24 upon which is mounted wing nut 25. A curved member 26 having an elongated slot 27 is adjustably secured by the wing nut 25 so that the angular end 28 serves as an adjustable stop for a purpose hereinafter to be described. The threaded member 24 rides in the slot 27 permitting the aforesaid adjustment.

Another open frame structure includes a pair of confronting channels having the two flange portions 29 and the opposite flange portions 30. The midportion is indicated by the numeral 31. An angle member 32 is suitably secured to the lower ends of these channels and maintains the same in spaced relation at the same distance apart as the channels first described are maintained. Another angle member 33, similarly secured to the upper ends of the second-mentioned channel members, secures the upper ends thereof in the same spaced relation.

Extending from each of the second-mentioned channel members and in suitably offset relation are the bars 34, the upper ends of which are notched as at 35 and said notches terminate in semi-circular bearing portions 36.

It will be obvious, see Figs. 1 and 2, that the mold structure, represented by the two angle members 32, 33, and the two second-mentioned channel members, may be readily elevated and simultaneously moved forwardly, or rather to the right, in Figs. 1 and 2 in order to detach this portion of the mold from the relatively stationary portion of the mold, the same being represented by the two first-mentioned uprights and the two first-mentioned channels connected by the stop member 15. The purpose of this detachable connection and the purpose of this pivotal connection will be set forth more fully hereinafter in describing the operation and use of this particular structure.

In Fig. 2 it will be noted that bearing on the lower flanges 18 of the first-mentioned channel members is a sheet of heat resisting material. This can be of metal, but preferably is of asbestos millboard type and is indicated by the numeral 37. It forms a support for the glass sheet indicated by the letter A. Thereabove, it will be noted, is provided another sheet of heat shielding material indicated by the numeral 38.

These sheets bear against the stop 15 at their lower ends and the lower end of the sheet A also bears against this stop. It, of course, is to be understood that instead of a single sheet of glass two or more sheets may be positioned in contact, as well as a single sheet and the amount and number of sheets is only determined by the thickness of the heat shielding sheets and the glass heated sheets and the width of the groove in the first-mentioned channels. For simplicity, only a single sheet A of glass is illustrated.

Again referring to Fig. 2, it will be noted that there is provided two asbestos sheets 39 and 40.

Operation and use of the device is as follows:

The tiltable mold portion shown to the right in Figs. 1 and 2 is elevated into the dotted line position as shown in Fig. 2. Thereupon, a sheet of glass is slipped into the movable mold portion and is slid downwardly until it reaches the upper end of the relatively stationary mold portion. Then it is fed in between the two asbestos sheets 37 and 38 and slid downwardly until it engages the stop 15. The two asbestos sheets 39 and 40 are then inserted in the confronting channels of the movable mold portion above and below the elevated glass sheet and then the mold with the glass sheet or sheets in initial position is subjected to heat.

Initially, the glass sheet supports the movable mold portion in elevated relation and constitutes the sole means for supporting the same. As the mold and glass are gradually subjected to greater heat, the flat portions of the glass naturally are protected by the heat shielding means described. When the temperature reaches glass softening temperature, the weight of the movable mold and the flat glass portion designated by the letter B gradually bends the glass portion C adjacent the asbestos sleeve 23 and above the same and the movable mold with the heat shields and the glass portion B gradually swings downwardly until the member 32 engages the upwardly extending portion or stop 28, when further swinging movement or lowering movement is prevented. Note the movable mold is supported by the pivots.

It will be quite evident that the bend of the glass will always be of predetermined character. This bend is indicated by the letter C. The flat portion A will be of predetermined length in all instances and since the bend C occurs at a predetermined point in the flat sheet, the portion B also will be of predetermined length. All sheets fabricated on this particular mold for any given stop adjustment will be alike. When two or more sheets are simultaneously bent, they will be bent alike and will have complementary surfaces, as the term is used herein.

When the glass has sufficiently softened at the portion C to permit the lowering of the movable mold portion into contact with the adjustable stop, the temperature is gradually reduced to cool the glass and the mold and to simultaneously anneal the glass so that by the time the bent glass in the mold and the mold are cooled, they may be manually removed without discomfort or the use of any tools.

After being removed, the hinge connection is disconnected and the movable mold portion with its shield means and the glass are moved upwardly and outwardly away from the stationary portion of the mold structure, thus sliding outwardly from the latter the flat glass portion A. When this is fully freed from the stationary mold portion, the movable mold portion may be slid downwardly on the glass portion B or the glass may be elevated to free it from the movable mold portion. Thereafter, the movable mold portion is re-associated in hinged relation with the stationary mold portion and a new flat sheet applied to the mold structure as previously described, whereupon the parts of the mold structure and the glass sheet again are in the position illustrated by the dotted lines in Fig. 2.

Another embodiment of the invention is illustrated in Fig. 3 and herein substantially the same basic disclosures found in Figs. 1 and 2 are incorporated. In this form of the invention, the mold structure is of dual articulated character. In other words, there are two hingedly or pivotally mounted movable mold sections and an intermediate stationary mold section. Each of these is of open-work character and with each there is employed heat shielding means.

Briefly, this structure is as follows:

A pair of angle members 50 have suitably secured thereto in spaced relation the spaced upright angle members 51. These spaced upright angle members are connected at their upper portions by two confronting angle members, the base portions being indicated by the numeral 52 and the upwardly directed side portions or flanges by the numeral 53. The two left-hand uprights 51, are suitably connected together by the angle member 54. To the same is also connected the upper angles 52—53, previously described.

The lower ends of the two left-hand upright angle members 51 are connected by the transverse angle member 55. In like manner, angle member 56 connects the right-hand upright angle members 51 at their upper ends and also is connected to the two angles 52—53. The lower ends of the two right-hand upright members 51 are connected by the transverse member 57. Each of these members 55 and 57, centrally but slightly offset from each other, is provided with an upwardly extending threaded member 58, with which is associated the wing nut 59.

A curved member 60, provided with a longitudinal slot 61 in which rides the threaded member 58, is secured in adjusted position by the wing nut 59 and the outer angularly directed end 62 of the member 60 serves as a stop. Extending outwardly from each opposite end of the angles 52—53 is a bar 63 and each pair of bars supports a rod 64, the ends of which project laterally beyond said bars 63. Enveloping said rods 64 between the bars 63 may be, if desired, a tubular heat shielding member, such as illustrated at 23 in Fig. 2. Herein same is omitted for clearness.

Since each movable mold portion in the present embodiment is substantially identical to the movable mold portion shown in Figs. 1 and 2, no further description thereof is believed necessary, except to designate the same by the numerals 70 and 71, the mold portion 70 having the cross member 72 and the mold portion 71 having the cross member 73, these being adapted to engage the upright portions 62 of the adjustable stop structures.

Each of these mold portions 70 and 71 includes at its upper or inner end, bar portions 74, the same carrying rods 64, bar portion 63 being vertically notched as at 75 similar to the notched arrangement shown at 35 and 36 in Fig. 1, but the direction of the notching herein being differently located because the structural positions are different. Each of the movable mold portions 70 and 71 are thus pivotally and detachably supported at opposite ends of the stationary mold structure.

Herein, there is illustrated a sheet of asbestos or like material 80 constituting a heat shield and resting on the two inwardly directed flanges of the angles 52—53.

A flat glass sheet is first provided at opposite ends with the two movable mold portions with the heat shielding means included and then the two spaced movable mold portions with the glass are lowered on to the stationary mold portion and the movable mold pivotal connections are effected. The glass and mold portions are then in the position illustrated by the dotted lines in Fig. 3.

Another method of initial application is to mount on the stationary mold portion a sheet of glass indicated by the letter G. Then from each end there is applied the movable mold portion, together with the heat shielding means. When they have been applied, the pivotal connections are effected. If desired, following the positioning of the parts as shown dotted in Fig. 3, there may be applied to the top of the glass surface supported by the stationary mold portion a heat shield designated by the numeral 90. This may be omitted if desired.

The open work character and heat shielding character each have certain advantages, all of which have been previously mentioned hereinbefore with reference to the form of the invention shown in Figs. 1 and 2.

After the movable and separable molds are associated as shown by dotted lines in Fig. 3 with the stationary mold portion, the combination articulated mold with the glass sheet or sheets are gradually subjected to increasing temperature until glass softening temperature is attained. When that is attained, the weight of the movable mold portion supported glass and the movable mold portions is such that the glass bends coaxially with the pivots of the rods 64.

This mold and glass movement is continued until the movable molds engage the adjustable stops. The glass and mold then are subjected to lowering temperatures thereby becoming cooler and when they are cooled the glass is annealed. The two removable mold portions are disconnected from the stationary section. This leaves the channel shaped glass resting on the stationary mold portion. Thereupon, the upper heat shield 90 is removed and then the entire channel glass member may be elevated and removed.

Following this, another glass sheet may be similarly applied to the stationary and movable mold portions, as previously described.

Of course, the tubular (cylindrical) shield at the pivotal axis may be replaced by any other conformation desired when a true radius bend is not desired.

Whenever necessary or desirable, there may be added to the movable mold portion an additional weight to facilitate bending of the glass. Also, springs may be used in lieu thereof whenever the nature of the article requires an upward bend. In this event, the springs must be of such material that they function under the extreme temperature conditions to which they would be subjected.

While the invention has been illustrated and described in great detail in the foregoing description, the same is to be considered as illustrative and not restrictive in character.

The several modifications described herein, as well as others which will readily suggest themselves to persons skilled in this art, are all considered to be within the broad scope of the invention, reference being had to the appended claims.

The invention claimed is:

1. Mold apparatus for bending glass sheets including a stationary base, a grooved frame carried thereby and adapted for glass sheet reception and support, a second grooved frame normally constrained to movement in a predetermined direction, means pivotally supporting the second frame upon the base in spaced relation to the first frame, one of the frames being detachably connected to the base and adapted for groove reception of the glass sheet, the two frames having coplanar alignment when a glass sheet is simultaneously included therein, the second frame being sustained by the glass sheet in said alignment against the constraint, and means coaxial with the pivotally supporting means for the second frame for glass sheet support between the frames, the glass upon softening adjacent said means bending about the same and permitting second frame pivoting by its constraint for bent glass sheet formation, removal thereof from the frames requiring the detachment of the detachable frame from the base.

2. Apparatus as defined by claim 1 wherein each grooved frame only supports the sheet at its edges and includes heat insulation means for heat shielding of the glass sheet portion immediately supported by the frame and by said insulation means for prevention of sheet bulging or sagging of the shielded portions of the sheet in the softening of the glass sheet between the shielding means of the frames.

3. Mold apparatus for bending glass sheets including a stationary base, a grooved frame rigid therewith, other grooved frames, one at each end of the former, each being pivotally and detachably connected to said base and normally constrained to movement in a predetermined direction, means pivotally and detachably supporting each constrained frame upon the base in spaced relation to the first frame, the three frames having coplanar alignment when a glass sheet is simultaneously included therein, each detachably and pivotally mounted frame when sheet associated being sustained by the sheet in the coplaner alignment against the constraint, and means coaxial with each pivotally supporting means for the pivoted frames for sheet support between the successive frames, the glass upon softening adjacent said means bending about the same and permitting tiltable frame pivoting by its constraint for bent glass sheet formation, removal thereof from the frames requiring detachment of the detachable frames from the base.

4. Apparatus as defined by claim 3 wherein each grooved frame only supports the sheet at its edges and includes heat insulation means for heat shielding of the glass sheet portion immediately supported by the frame and by said insulation means for prevention of sheet bulging or sagging of the shielded portions of the sheet in the softening of the glass sheet between the shielding means of the frames.

5. Apparatus as defined by claim 3 wherein adjustable stops are included for limiting the movement of the movable frames for predetermined bending of the sheet.

EDGAR R. BOYLES.
CLARENCE M. PATTISON.